United States Patent
Pan et al.

(10) Patent No.: US 9,706,347 B2
(45) Date of Patent: Jul. 11, 2017

(54) METHOD AND DEVICE FOR DETERMINING POSITION

(71) Applicant: Xiaomi Inc., Beijing (CN)

(72) Inventors: Jun Pan, Beijing (CN); Yuheng Qi, Beijing (CN); Dailin Jiang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/587,067

(22) Filed: Dec. 31, 2014

(65) Prior Publication Data

US 2015/0350824 A1 Dec. 3, 2015

Related U.S. Application Data

(63) Continuation of application No. PCT/CN2014/089209, filed on Oct. 22, 2014.

(30) Foreign Application Priority Data

May 30, 2014 (CN) .......................... 2014 1 0240113

(51) Int. Cl.
*H04W 24/00* (2009.01)
*H04W 4/02* (2009.01)
(Continued)

(52) U.S. Cl.
CPC ............ *H04W 4/02* (2013.01); *G01C 21/005* (2013.01); *H04W 64/00* (2013.01)

(58) Field of Classification Search
CPC ....... H04W 4/02; H04W 64/00; G01C 21/005
(Continued)

(56) References Cited

U.S. PATENT DOCUMENTS

| 7,149,504 B1* | 12/2006 | Weaver | H04W 64/00 455/414.2 |
| 9,198,004 B2* | 11/2015 | Das | G01C 21/206 |

(Continued)

FOREIGN PATENT DOCUMENTS

| CN | 1831911 A | 9/2006 |
| CN | 103500217 A | 1/2014 |

(Continued)

OTHER PUBLICATIONS

International Search Report issued on Feb. 4, 2015, for PCT International Application No. PCT/CN2014/089209.

(Continued)

*Primary Examiner* — Amancio Gonzalez
(74) *Attorney, Agent, or Firm* — Finnegan, Henderson, Farabow, Garrett & Dunner LLP (57) ABSTRACT

The present disclosure provides a method and a terminal for determining a position. The method includes detecting a position request of a designated application and acquiring a position coordinate of the terminal through a positioning function. The method also includes determining a designated region to which the position coordinate belongs, in pre-stored correspondence relationships between position coordinate ranges and designated regions. The method further includes responding to the position request of the designated application according to the designated region to which the position coordinate belongs.

9 Claims, 5 Drawing Sheets

(51) Int. Cl.
*H04W 64/00* (2009.01)
*G01C 21/00* (2006.01)

(58) Field of Classification Search
USPC ...................................................... 455/456.1
See application file for complete search history.

(56) References Cited

U.S. PATENT DOCUMENTS

2009/0048778 A1* 2/2009 Borkowicz ............ B60R 25/33
701/469
2012/0303432 A1* 11/2012 Hasson .............. G06Q 30/0207
705/14.23

FOREIGN PATENT DOCUMENTS

| CN | 103747524 A | 4/2014 |
|---|---|---|
| CN | 103813451 A | 5/2014 |
| CN | 104063423 A | 9/2014 |
| JP | 3617939 B2 | 2/2005 |
| JP | 2005-301891 A | 10/2005 |
| JP | 2007-164534 | 6/2007 |
| JP | 2007-329871 A | 12/2007 |
| JP | 2015-512227 A | 4/2015 |
| KR | 20060127586 A | 12/2006 |
| KR | 20090059518 A | 6/2009 |
| TW | 201137746 A1 | 11/2011 |

OTHER PUBLICATIONS

European Search Report issued on Aug. 15, 2014, in counterpart EP Application No. 15163358.3-1958.
"FREE Sygic GPS Navigation for Android version 12.1.3", dated Mar. 2, 2013, URL:https://www.youtube.com/watch?v=NkUOD2Qr3Nk, (Jul. 2, 2015), XP054975955 [X] 1-13 the whole document.
Tomtom, "Manual and Tutorials, TomTom Navigator", dated Jan. 1, 2004, URL:http://www.tomtom.com/lib/doc/ttnpalmone_manual_uk.pdf, (retrieved Jul. 2, 2015), XP055199844 [X] 1-13 p. 7, 15.

* cited by examiner

METHOD AND DEVICE FOR DETERMINING POSITION

CROSS-REFERENCE TO RELATED APPLICATIONS

This application is a continuation of International Application No. PCT/CN2014/089209, filed Oct. 22, 2014, which is based upon and claims priority to Chinese Patent Application No. 201410240113.9, filed May 30, 2014, the entire contents of all of which are incorporated herein by reference.

TECHNICAL FIELD

The present disclosure generally relates to a field of computer technology and, more particularly, to a method and a device for determining a position.

BACKGROUND

With the development of computer technology and positioning technology, an increasing number of non-map applications are offering location-based services for users by acquiring positions of terminals.

Conventionally, a non-map application acquires a current position coordinate of a terminal by calling a positioning function in the terminal, and sends the position coordinate with a position request to a third party application through an opening application programming interface (API) reserved for the third party application. Then the third party application sends the position coordinate to a server for a map application over a network, to query the position. Finally, the third party application sends the position returned by the server as a corresponding result to the non-map application. Afterwards, the non-map application provides a position-related service to a user according to the acquired position.

SUMMARY

According to a first aspect of the present disclosure, there is provided a method for a terminal to determine a position, comprising: detecting a position request of a designated application and acquiring a position coordinate of the terminal through a positioning function; determining, in pre-stored correspondence relationships between position coordinate ranges and respective designated regions, a designated region to which the position coordinate belongs; and responding to the position request of the designated application according to the determined designated region to which the position coordinate belongs.

According to a second aspect of the present disclosure, there is provided a terminal, comprising a processor and a memory for storing instructions executable by the processor. The processor is configured to perform: detecting a position request of a designated application and acquiring a position coordinate of the terminal through a positioning function; determining, in pre-stored correspondence relationships between position coordinate ranges and respective designated regions, a designated region to which the position coordinate belongs; and responding to the position request of the designated application according to the determined designated region to which the position coordinate belongs.

According to a third aspect of the present disclosure, there is provided a non-transitory computer-readable storage medium storing instructions that, when executed by a processor of a terminal, cause the terminal to perform a method for determining a position. The method comprises detecting a position request of a designated application and acquiring a position coordinate of the terminal through a positioning function; determining, in pre-stored correspondence relationships between position coordinate ranges and respective designated regions, a designated region to which the position coordinate belongs; and responding to the position request of the designated application according to the determined designated region to which the position coordinate belongs.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
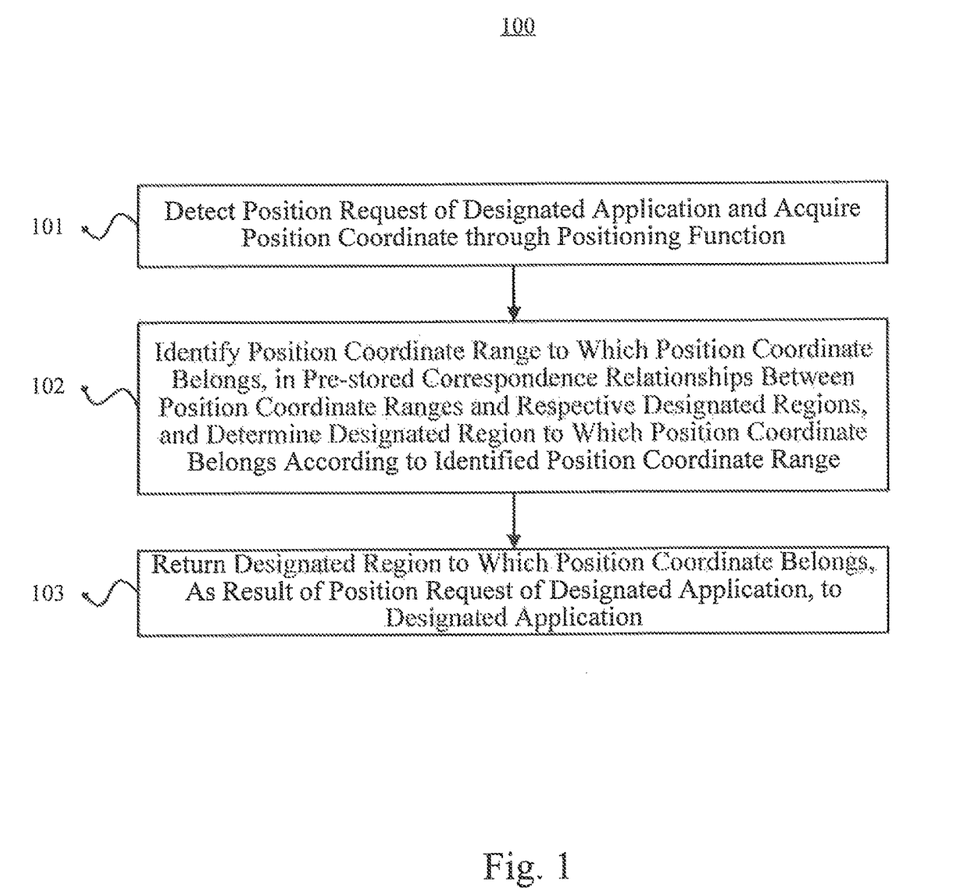
FIG. 1 is a flow chart of a method for determining a position, according to an exemplary embodiment.

FIG. 1 is a flow chart of a method 100 for determining a position, according to an exemplary embodiment. For example, the method 100 may be used in a terminal. Referring to FIG. 1, the method 100 includes the following steps.

In step 101, when the terminal detects a position request of a designated application, the terminal acquires a position coordinate of the terminal through a positioning function.

In exemplary embodiments, when the designated application provides a position-based service to a user, the designated application sends the position request to an operating system of the terminal. When the operating system detects the position request of the designated application, the operating system calls a positioning module in the terminal to acquire the position coordinate of the terminal. In some exemplary embodiments, the operating system is an Android system, and the operating system monitors operations of each application and performs a corresponding process according to the operations of each application.

In exemplary embodiments, the position request of the designated application requests for determining a current position of the terminal. For example, to respond to the position request of the designated application, a designated region in which the terminal is located can be returned to the designated application.

In exemplary embodiments, the terminal acquires the position coordinate based on, e.g., positioning through a Global Positioning System (GPS) module built in the terminal, positioning through a base station, or positioning through Wireless-Fidelity (Wi-Fi).

In exemplary embodiments, the position coordinate may include, but not limited to, a latitude and longitude coordinate.

In exemplary embodiments, correspondence relationships between position coordinate ranges and respective designated regions may be pre-stored in the terminal. For example, the correspondence relationships between position coordinate ranges and respective designated regions may include a correspondence relationship between a latitude and longitude coordinate range of Beijing and the Beijing region, which may be stored in a format such as: bj:[{lat: [40.154237, 39.711966], lng:[116.607237, 16.099120]}]. In addition, a correspondence relationship between a latitude and longitude coordinate range of Taiwan and the Taiwan region may be stored in a format such as: tw:[{lat:[10.123456, 12.151213], lng:[120.121212, 121.121212]}].

In exemplary embodiments, the correspondence relationships do not indicate that the designated region (e.g., Beijing) is identical to a region described by the corresponding position coordinate range. Instead, the correspondence relationships indicate that the region described by the position coordinate range belongs to the designated region (e.g., Beijing).

In step 102, the terminal identifies a position coordinate range to which the position coordinate of the terminal belongs in the pre-stored correspondence relationships between position coordinate ranges and respective designated regions, and determines a designated region to which the position coordinate belongs according to the identified position coordinate range.

For example, after the terminal acquires the current position coordinate of the terminal in step 101, the terminal searches the position coordinate ranges included in the correspondence relationships between position coordinate ranges and respective designated regions according to the current position coordinate, thereby to identify the position coordinate range to which the current position coordinate belongs.

In exemplary embodiments, in the correspondence relationships between position coordinate ranges and respective designated regions, a plurality of different designated regions with overlapping position coordinate ranges may exist. For example, the correspondence relationships between position coordinate ranges and respective designated regions may include a correspondence relationship between a latitude and longitude coordinate range of China and the China region, and a correspondence relationship between a latitude and longitude coordinate range of Beijing and the Beijing region. In this example, the latitude and longitude coordinate range of China covers the latitude and longitude coordinate range of Beijing.

Thus, in some exemplary embodiments, in step 102, during the process of determining the position coordinate range to which the position coordinate of the terminal belongs by searching the position coordinate ranges included in the correspondence relationships between position coordinate ranges and respective designated regions according to the position coordinate, the terminal identifies a position coordinate range that is first identified to match the position coordinate of the terminal as a query result of the position coordinate range.

The terminal then determines the designated region that corresponds to the identified position coordinate range according to the correspondence relationship between the identified position coordinate range and the designated region.

In step 103, the terminal returns the designated region to which the position coordinate belongs to the designated application, as a result of the position request of the designated application.

Figure 2:
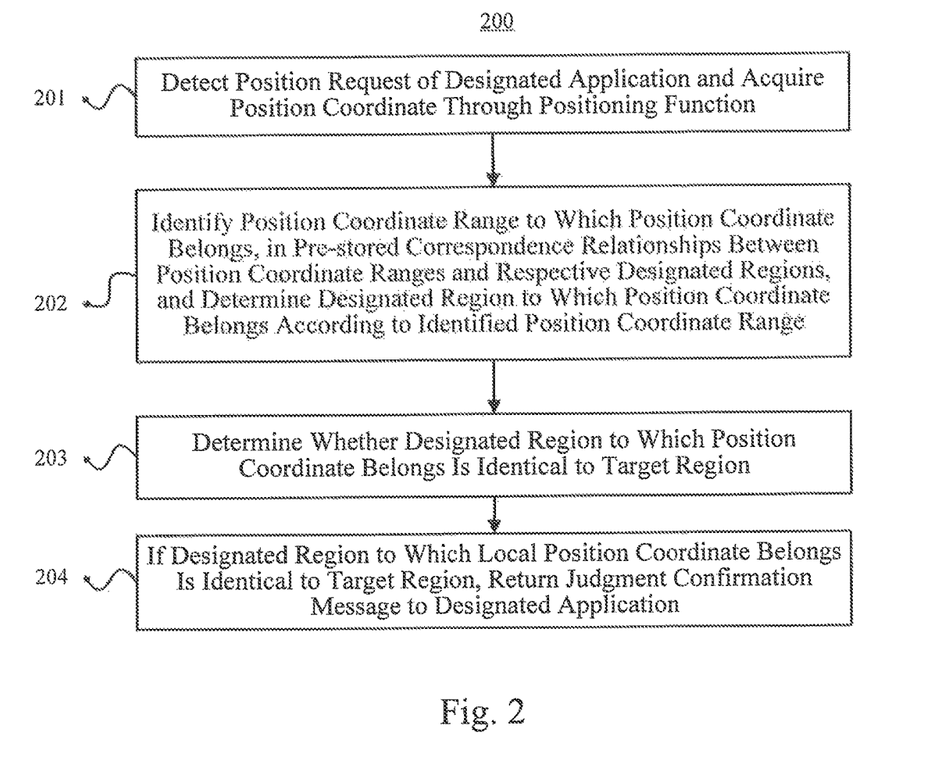
FIG. 2 is a flow chart of a method for determining a position, according to an exemplary embodiment.

FIG. 2 is a flow chart of a method 200 for determining a position, according to an exemplary embodiment. For example, the method 200 may be used in a terminal. Referring to FIG. 2, the method 200 includes the following steps.

In step 201, when the terminal detects a position request of a designated application, the terminal acquires a position coordinate of the terminal through a positioning function.

In exemplary embodiments, when the designated application provides a position-based service to a user, the designated application sends the position request to an operating system of the terminal. When the operating system detects the position request from the designated application, the operating system calls a positioning module in the terminal to acquire the position coordinate.

In exemplary embodiments, the position request of the designated application requests for judging whether a region where the terminal is currently located is identical to a designated region in the designated application. To respond to the position request of the designated application, a judgment result can be returned to the designated application. Thus, a target region to be judged whether to be the region where the terminal is currently located may be carried in the position request of the designated application.

In exemplary embodiments, the terminal acquires the position coordinate based on, e.g., positioning through a GPS module built in the terminal, positioning through a base station, or positioning through Wi-Fi.

In exemplary embodiments, the position coordinate may include, but not limited to, a latitude and longitude coordinate.

In exemplary embodiments, correspondence relationships between position coordinate ranges and respective designated regions may be pre-stored in the terminal. For example, the correspondence relationships between the position coordinate ranges and the respective designated regions may include a correspondence relationship between a latitude and longitude coordinate range of Beijing and the Beijing region, which may be stored in a format such as: bj:[{lat:[40.154237, 39.711966], lng:[116.607237, 116.099120]}].

In addition, a correspondence relationship between a latitude and longitude coordinate range of Taiwan and the Taiwan region may be stored as: tw:[{lat:[10.123456, 12.151213], lng:[120.121212, 121.121212]}].

In exemplary embodiments, the correspondence relationships do not indicate that a designated region (e.g., Beijing) is equivalent to a region described by the corresponding position coordinate range. Instead, the correspondence relationships indicate that the region described by the position coordinate range belongs to the designated region (e.g., Beijing).

In step 202, the terminal identifies a position coordinate range to which the position coordinate of the terminal belongs in the pre-stored correspondence relationships between position coordinate ranges and respective designated regions, and determines a designated region to which the position coordinate belongs according to the identified position coordinate range.

For example, after the terminal acquires the current position coordinate of the terminal in step 201, the terminal searches the position coordinate ranges included in the correspondence relationships between position coordinate ranges and respective designated regions according to the current position coordinate, to identify the position coordinate range to which the current position coordinate belongs.

In some exemplary embodiments, in the correspondence relationships between position coordinate ranges and designated regions, a plurality of different designated regions with overlapping position coordinate ranges may exist. For example, the correspondence relationships between position coordinate ranges and respective designated regions may include a correspondence relationship between a latitude and longitude coordinate range of China and the China region, and a correspondence relationship between a latitude and longitude coordinate range of Beijing and the Beijing region. In this example, the latitude and longitude coordinate range of China covers the latitude and longitude coordinate range of Beijing.

Thus, in some exemplary embodiments, in step 202, during the process of determining the position coordinate range to which the position coordinate belongs, by searching the position coordinate ranges included in the correspondence relationships between position coordinate ranges and respective designated regions according to the position coordinate, the terminal identifies a position coordinate range that is first identified to match the position coordinate as a query result of the position coordinate range.

The terminal then determines the designated region that corresponds to the identified position coordinate range according to the correspondence relationship between the identified position coordinate range and the designated region.

In step 203, the terminal determines whether the designated region to which the position coordinate belongs is identical to the target region.

In some exemplary embodiments, steps 202 and 203 may be replaced by the terminal querying a position coordinate range of the target region in the pre-stored correspondence relationships between position coordinate ranges and respective designated regions, and determining whether the position coordinate acquired in step 201 belongs to the target region by judging whether the position coordinate belongs to the position coordinate range of the target region.

In step 204, if the designated region to which the position coordinate belongs is identical to the target region, the terminal returns a judgment confirmation message to the designated application.

An application scenario of the method 200 is illustrated according to the following exemplary embodiment.

When a designated application displays a position by using map coordinates, the designated application may determine a position of the terminal, and calls a map application according to the position of the terminal. When selecting a map application, the designated application may issue a position request including the Chinese mainland region as a target region. If the terminal performs steps 201 to 204 and determines that the terminal is located in the Chinese mainland region, the terminal returns a judgment confirmation message to the designated application (that is, a message indicating that the result is true), and then the designated application calls a Baidu map to display the position. On the other hand, if the terminal performs steps 201 to 204 and determines that the terminal is not located in the Chinese mainland region, the terminal returns a judgment unconfirmed message to the designated application (that is, a message indicating that the result is false), then the designated application calls a Google map to display the position.

Figure 3:
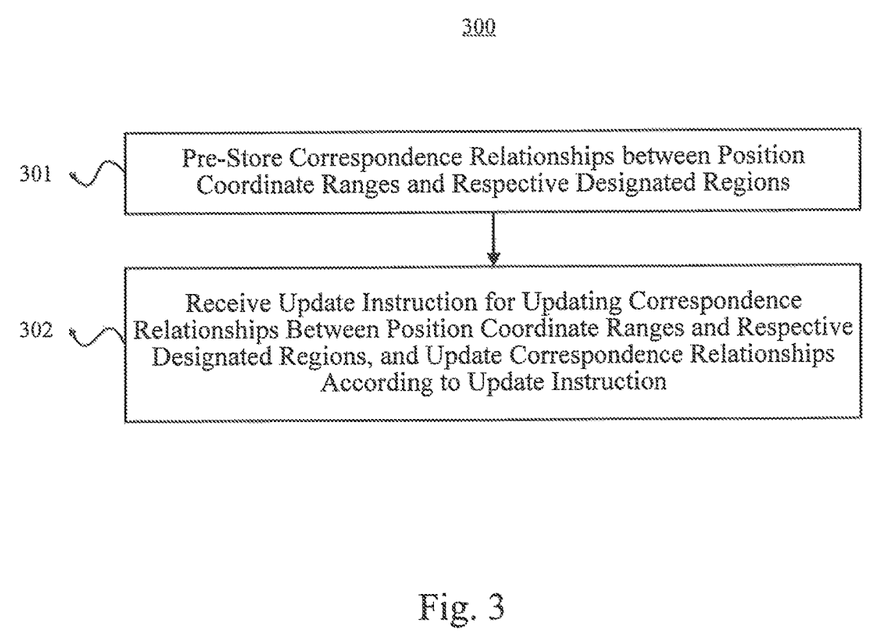
FIG. 3 is a flow chart of a method for determining a position, according to an exemplary embodiment.

FIG. 3 is a flow chart of a method 300 for determining a position, according to an exemplary embodiment. For example, the method 300 may be performed by a terminal. In the present embodiment, correspondence relationships between position coordinate ranges and respective designated regions may be maintained by the terminal receiving an update instruction from a server, or by a user manually modifying the correspondence relationships. Referring to FIG. 3, the method 300 includes the following steps.

In step 301, the terminal pre-stores the correspondence relationships between position coordinate ranges and respective designated regions.

In step 302, the terminal receives an update instruction for updating the correspondence relationships between position coordinate ranges and respective designated regions, and updates the correspondence relationships according to the update instruction.

In exemplary embodiments, the update instruction may include performing addition, modification, deletion, or the like, for the correspondence relationships between position coordinate ranges and respective designated regions.

In exemplary embodiments, when a designated application initiates a position request, a position coordinate is acquired through a positioning function, a designated region to which the position coordinate belongs is determined in the pre-stored correspondence relationships between position coordinate ranges and respective designated regions, and the position request of the designated application is responded according to the designated region to which the position coordinate belongs.

The above described methods may be used in applications which do not require specific position information, such as a street address (NO. XX, XX building, XX street), but may require determining a geographic region to which the terminal; belongs, or whether the terminal is located in a target region. The above described methods may identify a position range of the terminal quickly and locally, without performing a query of the specific position information over a network.

Figure 4:
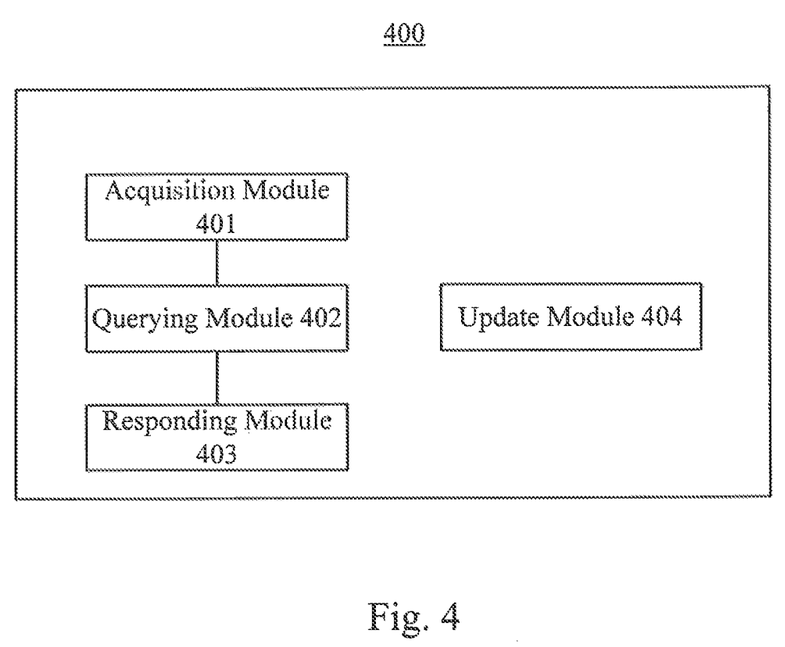
FIG. 4 is a block diagram of an apparatus for determining a position, according to an exemplary embodiment.

FIG. 4 is a block diagram of an apparatus 400 for determining a position, according to an exemplary embodiment. For example, the apparatus 400 may be a terminal, or a part of a terminal. Referring to FIG. 4, the apparatus 400 includes an acquisition module 401, an querying module 402, and a responding module 403.

The acquisition module 401 is configured to, when a position request of a designated application is detected, acquire a position coordinate of the terminal through a positioning function.

The querying module 402 is configured to determine a designated region to which the position coordinate belongs in pre-stored correspondence relationships between position coordinate ranges and respective designated regions. The responding module 403 is configured to respond to the position request of the designated application according to the determined designated region.

In exemplary embodiments, the querying module 402 is configured to identify a position coordinate range to which the position coordinate of the terminal belongs in the pre-stored correspondence relationships between position coordinate ranges and respective designated regions, and determine the designated region to which the position coordinate acquired by the acquisition module belongs according to the identified position coordinate range.

In exemplary embodiments, the responding module 403 includes a first returning unit (not shown) configured to return the designated region to which the position coordinate belongs, as a result of the position request of the designated application, to the designated application.

In exemplary embodiments, the position request carries a target region to be judged whether to be a region where the terminal is currently located, and the responding module 403 includes a determination unit (not shown) and a second returning unit (not shown). The determination unit is configured to determine whether the designated region to which the position coordinate belongs is identical to the target region. The second returning unit is configured to, if the designated region to which the position coordinate belongs is identical to the target region, return a judgment confirmation message to the designated application.

In exemplary embodiments, the apparatus 400 further includes an update module 404 configured to receive an instruction for updating the correspondence relationships between position coordinate ranges and respective designated regions, and update the correspondence relationships between position coordinate ranges and designated regions according to the update instruction.

In exemplary embodiments, when a designated application initiates a position request, a position coordinate is acquired through a positioning function, a designated region to which the position coordinate belongs is determined in the pre-stored correspondence relationships between position coordinate ranges and respective designated regions, and the position request of the designated application is responded according to the designated region to which the position coordinate belongs.

Figure 5:
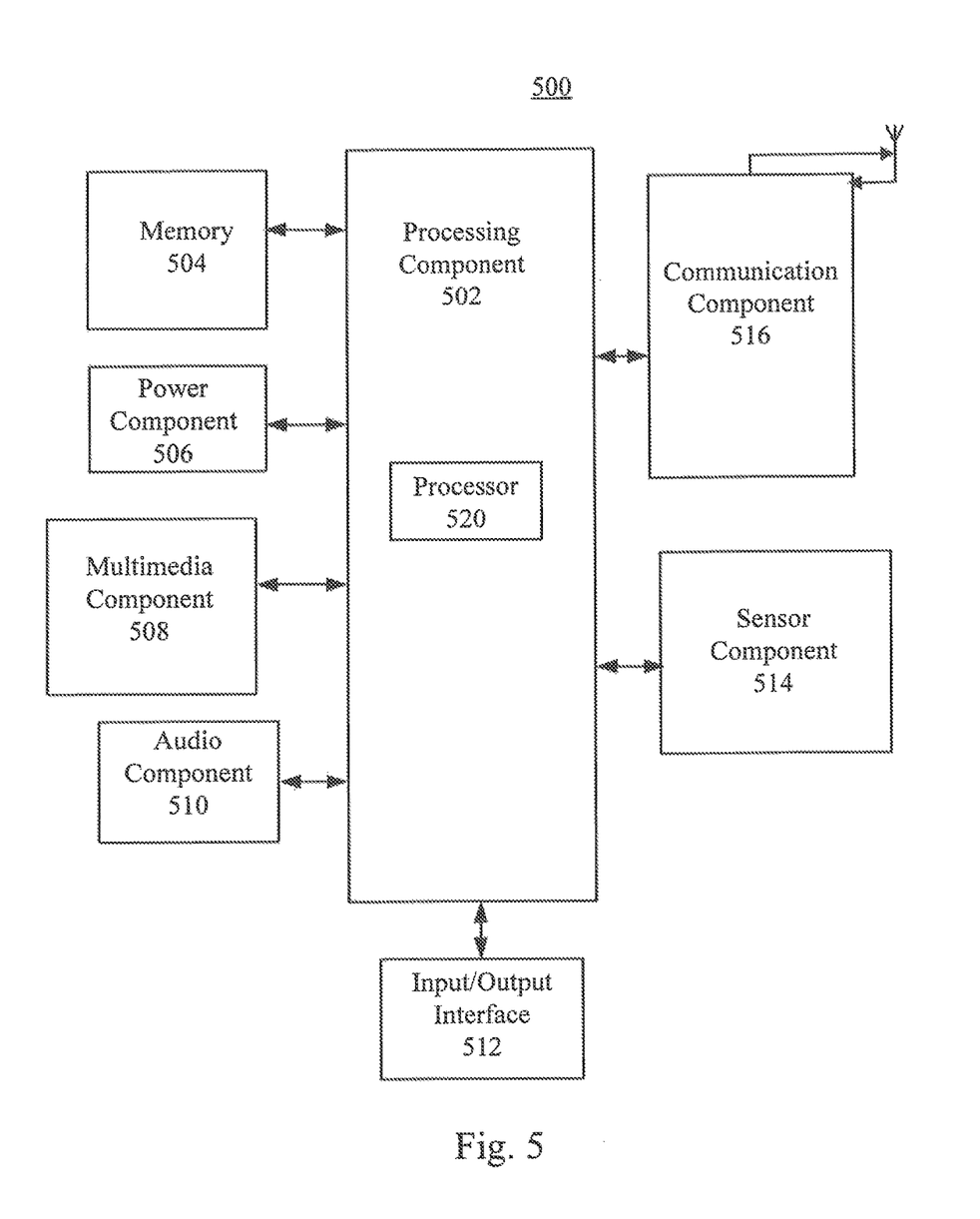
FIG. 5 is a block diagram of a device for determining a position, according to an exemplary embodiment.

FIG. 5 is a block diagram of a device 500 for determining a position, according to an exemplary embodiment. For example, the device 500 may be a mobile phone, a computer, a digital broadcast terminal, a messaging device, a gaming console, a tablet, a medical device, exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 for executing instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a BLUETOOTH (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 520 in the device 500, for performing the above-described methods. For example, the non-transitory computer-readable storage medium may be a ROM, a RAM, a CD-ROM, a magnetic tape, a floppy disc, an optical data storage device, and the like.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a terminal to determine a position, comprising:
    storing correspondence relationships between position coordinate ranges and respective designated regions in the terminal, the position coordinate ranges being latitude and longitude coordinate ranges of the respective designated regions;
    detecting a position request of a designated application and acquiring a position coordinate of the terminal through a positioning function, the acquired position coordinate of the terminal being a latitude and longitude coordinate of the terminal;
    identifying a position coordinate range to which the acquired position coordinate of the terminal belongs in the correspondence relationships between position coordinate ranges and respective designated regions;
    determining, according to the correspondence relationships between position coordinate ranges and respective designated regions stored in the terminal, a designated region that corresponds to the identified position coordinate range; and
    responding to the position request of the designated application according to the determined designated region to which the position coordinate belongs.

2. The method according to claim 1, wherein the responding to the position request of the designated application comprises:
    returning the determined designated region, as a result of the position request of the designated application, to the designated application.

3. The method according to claim 1, wherein when the position request includes a target region to be judged whether to be a region in which the terminal is currently located, the responding to the position request of the designated application comprises:
    determining whether the determined designated region is identical to the target region; and
    if the determined designated region is identical to the target region, returning a judgment confirmation message to the designated application.

4. The method according to claim 1, further comprising:
    receiving an update instruction for updating the correspondence relationships between position coordinate ranges and respective designated regions; and
    updating the correspondence relationships between position coordinate ranges and respective designated regions according to the update instruction.

5. A terminal, comprising:
    a processor; and
    a memory for storing instructions executable by the processor and correspondence relationships between position coordinate ranges and respective designated regions, the position coordinate ranges being latitude and longitude coordinate ranges of the respective designated regions;
    wherein the processor is configured to perform:
        detecting a position request of a designated application and acquiring a position coordinate of the terminal through a positioning function, the acquired position coordinate of the terminal being a latitude and longitude coordinate of the terminal;
        identifying a position coordinate range to which the acquired position coordinate of the terminal belongs in the correspondence relationships between position coordinate ranges and respective designated regions;
        determining, according to the correspondence relationships between position coordinate ranges and respective designated regions stored in the memory, a designated region that corresponds to the identified position coordinate range; and
        responding to the position request of the designated application according to the determined designated region to which the position coordinate belongs.

6. The terminal according to claim 5, wherein the processor is further configured to perform:
    returning the determined designated region, as a result of the position request of the designated application, to the designated application.

7. The terminal according to claim 5, wherein when the position request includes a target region to be judged whether to be a region in which the terminal is currently located, the processor is further configured to perform:
- determining whether the determined designated region is identical to the target region; and
- if the determined designated region is identical to the target region, returning a judgment confirmation message to the designated application.

8. The terminal according to claim 5, wherein the processor is further configured to perform:
- receiving an update instruction for updating the correspondence relationships between position coordinate ranges and respective designated regions; and
- updating the correspondence relationships between position coordinate ranges and respective designated regions according to the update instruction.

9. A non-transitory computer-readable storage medium storing instructions that, when executed by a processor of a terminal, cause the terminal to perform a method for determining a position, the method comprising:
- storing correspondence relationships between position coordinate ranges and respective designated regions in the terminal, the position coordinate ranges being latitude and longitude coordinate ranges of the respective designated regions;
- detecting a position request of a designated application and acquiring a position coordinate of the terminal through a positioning function, the acquired position coordinate of the terminal being a latitude and longitude coordinate of the terminal;
- identifying a position coordinate range to which the acquired position coordinate of the terminal belongs in the correspondence relationships between position coordinate ranges and respective designated regions;
- determining, according to the correspondence relationships between position coordinate ranges and respective designated regions stored in the terminal, a designated region that corresponds to the identified position coordinate range; and
- responding to the position request of the designated application according to the determined designated region to which the position coordinate belongs.

* * * * *